United States Patent
Ginzburg

(10) Patent No.: US 11,687,533 B2
(45) Date of Patent: Jun. 27, 2023

(54) CENTRALIZED STORAGE FOR SEARCH SERVERS

(71) Applicant: salesforce.com, inc., San Francisco, CA (US)

(72) Inventor: Ilan Ginzburg, Saint Pancrasse (FR)

(73) Assignee: Salesforce, Inc., San Francisco, CA (US)

( * ) Notice: Subject to any disclaimer, the term of this patent is extended or adjusted under 35 U.S.C. 154(b) by 57 days.

(21) Appl. No.: 17/255,328

(22) PCT Filed: Jun. 22, 2018

(86) PCT No.: PCT/IB2018/000937
§ 371 (c)(1),
(2) Date: Dec. 22, 2020

(87) PCT Pub. No.: WO2019/243859
PCT Pub. Date: Dec. 26, 2019

(65) Prior Publication Data
US 2021/0263919 A1    Aug. 26, 2021

(51) Int. Cl.
*G06F 16/00* (2019.01)
*G06F 16/2455* (2019.01)
(Continued)

(52) U.S. Cl.
CPC ...... *G06F 16/2455* (2019.01); *G06F 16/2272* (2019.01); *G06F 16/27* (2019.01)

(58) Field of Classification Search
None
See application file for complete search history.

(56) References Cited

U.S. PATENT DOCUMENTS 8,429,447 B2 *  4/2013  Peng .................. G06F 11/2038
                                                    714/4.11
8,661,428 B2 *  2/2014  Clark ................. G06F 16/1844
                                                     717/169
(Continued)

FOREIGN PATENT DOCUMENTS

EP          0365115 A2    4/1990
WO      2001/027746 A2    4/2001

OTHER PUBLICATIONS

International Search Report and Written Opinion in PCT Appl. No. PCT/IB2018/000937 dated Nov. 19, 2018, 10 pages.

*Primary Examiner* — Debbie M Le
(74) *Attorney, Agent, or Firm* — Kowert, Hood, Munyon, Rankin & Goetzel, P.C.; Mark D. Seegers; Dean M. Munyon

(57) ABSTRACT

Techniques are disclosed relating to servicing search requests based on index information stored in a storage shared between multiple search servers. In some embodiments, a first search server maintains a local cache including index information usable to service received search requests and synchronizes the local cache with the shared storage. The synchronizing includes retrieving, from the shared storage, metadata indicative of the index information in the shared storage and determining, based on the metadata, whether the index information in the local cache differs from the shared storage. In response to determining that the index information in the local cache differs from the index information in the shared storage, the first search server updates the index information in the local cache with the index information in the shared storage. The first search server may then provide one or more search results determined using the updated index information.

19 Claims, 9 Drawing Sheets

(51) Int. Cl.
*G06F 16/27* (2019.01)
*G06F 16/22* (2019.01)

(56) References Cited

U.S. PATENT DOCUMENTS

| | | | |
|---|---|---|---|
| 9,201,889 B1* | 12/2015 | Madany | G06F 16/148 |
| 9,251,150 B2* | 2/2016 | Hirakata | H04L 63/105 |
| 9,886,443 B1* | 2/2018 | Gupta | G06F 16/188 |
| 10,417,213 B1* | 9/2019 | Mukku | G06F 3/067 |
| 2008/0104100 A1 | 5/2008 | Richardson et al. | |
| 2008/0301087 A1 | 12/2008 | Bernard | |
| 2010/0005151 A1 | 1/2010 | Gokhale | |
| 2011/0125704 A1 | 5/2011 | Mordvinova et al. | |
| 2016/0110406 A1* | 4/2016 | Zircher | G06F 16/282 |
| | | | 707/690 |

* cited by examiner

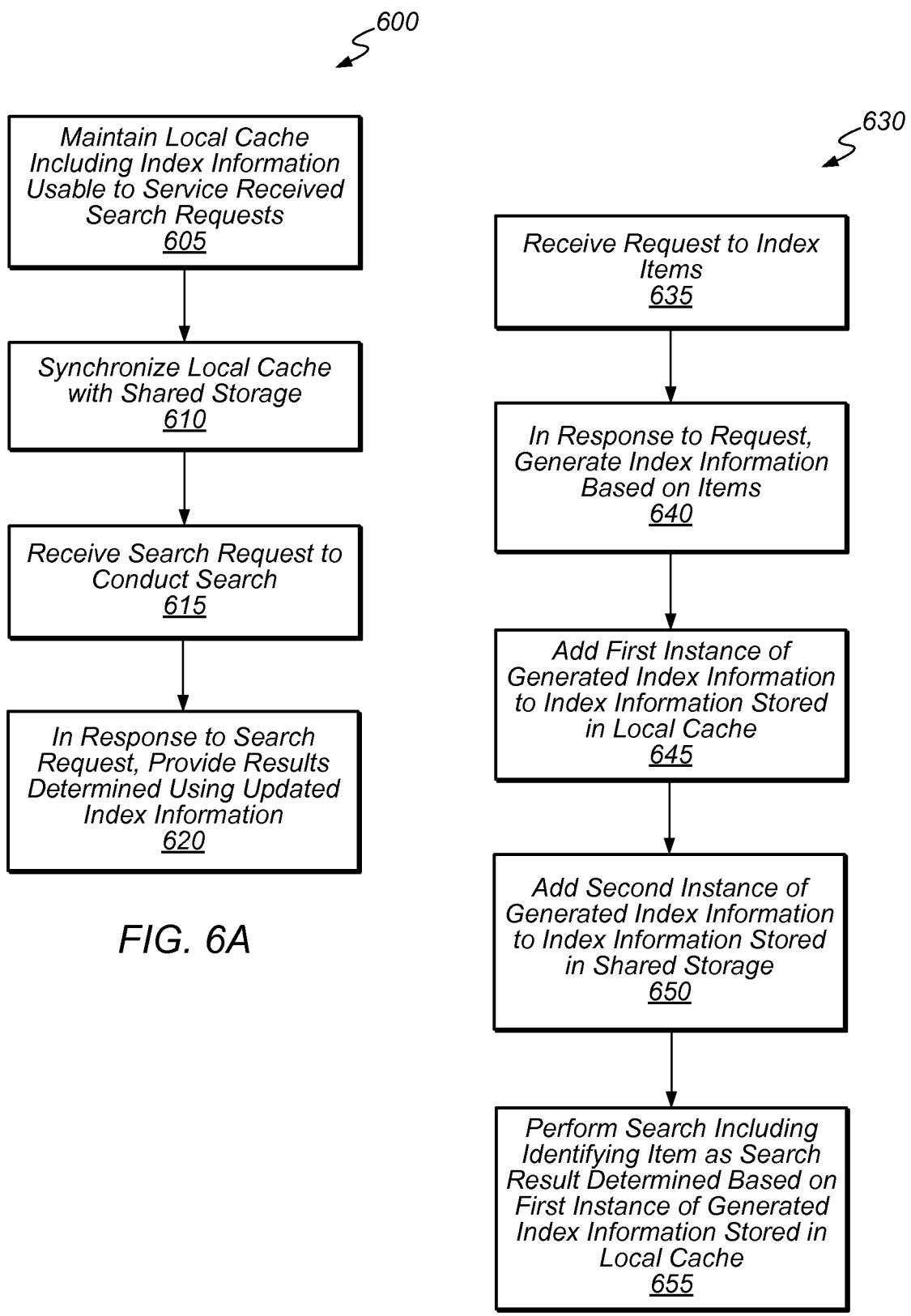

CENTRALIZED STORAGE FOR SEARCH SERVERS

BACKGROUND

Technical Field

This disclosure relates generally to computing systems, and, more specifically, to computing systems that facilitate servicing search requests.

Description of the Related Art

A computing system maintaining a large amount of information may implement a search functionality in order to allow a user to quickly find desired information. For example, an organization's system may maintain a large number of contact records for various employees and allow a user to search for a particular one by supplying one or more terms such as an employee's last name. To implement this functionality, the system may use a search server, such an Apache Solr™ server, to service requests to search for information. Such a server may index received documents to produce an index data structure, which is accessed when a search request is received to determine search results.

Using an index data structure can allow searches to be performed more quickly than scanning each document for various terms when a search is received.

BRIEF DESCRIPTION OF THE DRAWINGS

FIGS. 6A-6C are flow diagrams illustrating embodiments of methods performed by the search system.

Figure 1:
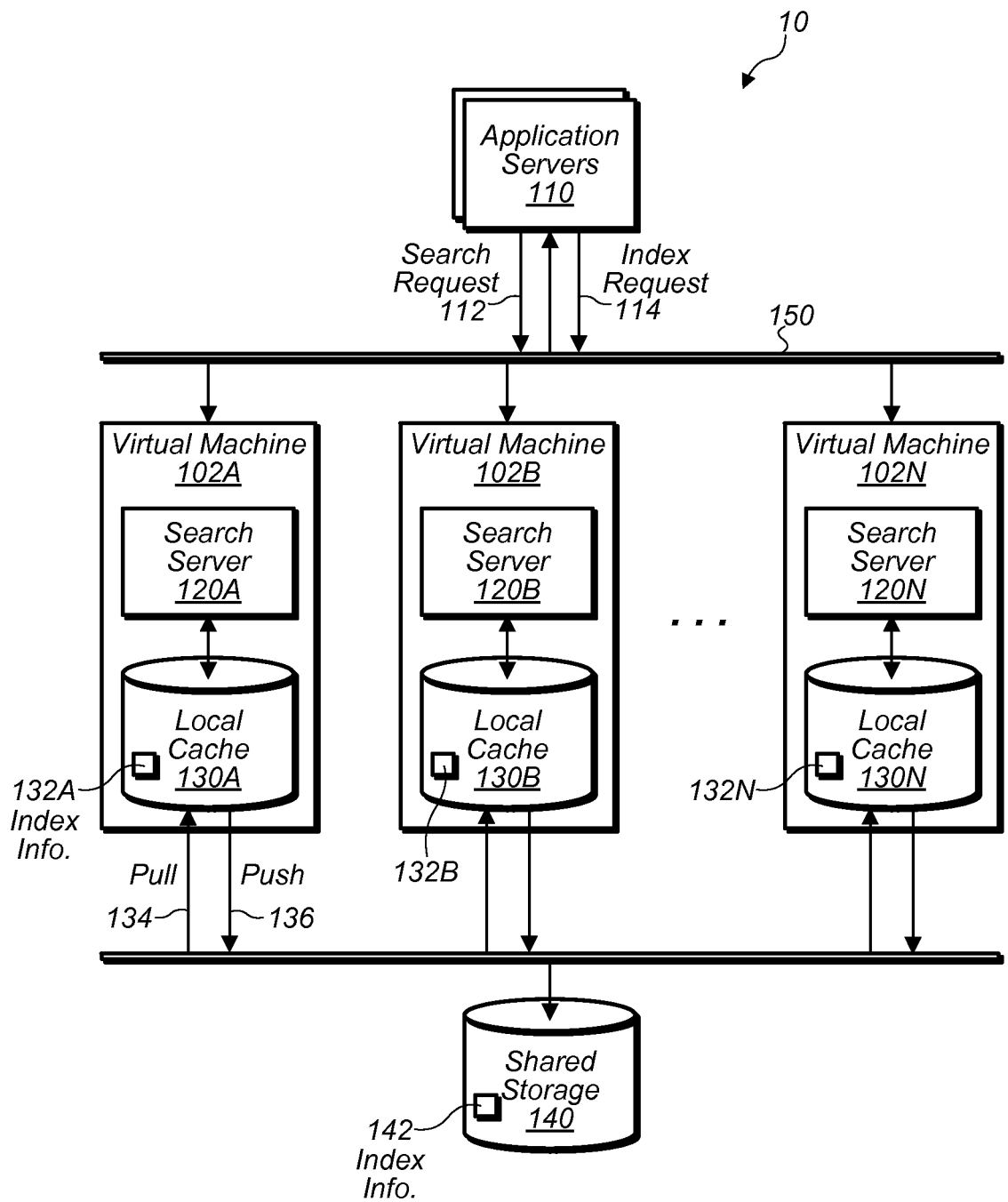
FIG. 1 is a block diagram illustrating one embodiment of a search system that maintains index information in a storage shared between multiple search servers.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "storage configured to store index information" is intended to cover, for example, one or more computer systems that perform this function during operation, even if the computer systems in question afire not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a computer cluster having multiple search servers, the terms "first" and "second" search servers can be used to refer to any two of the search servers. In other words, the "first" and "second" search servers are not limited to the initial servers to the join the cluster, for example.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

When a computing system continually receives a large volume of search queries, multiple search servers may be used to distribute the processing of queries. To facilitate this distributed processing, a given server may be responsible for maintaining at least portion of the index, which is stored locally or in a storage dedicated to that server. This storage scheme, however, has some deficiencies. Individual servers are susceptible to crashes, which can result in the loss of index information since a server is responsible for maintaining a portion of the index. Scaling the number of search servers based on demand can also be more tedious as a newly added search server may burden others servers to obtain a copy of the current index information. To mitigate this potential loss of performance, additional search servers may be provisioned, but they may be underutilized if demand spikes are infrequent. Moreover, distributing index information updates across a large number of search servers can consume network bandwidth and waste a server's performance as it attempts contact other servers to distribute each update.

The present disclosure describes embodiments in which index information for multiple search servers is instead maintained in a storage that is shared among the servers. As will be described in greater detail below in various embodiments, a search server can maintain index information in a local cache that is periodically synchronized with the shared storage. Accordingly, if the server receives a search request, it can service the request using the index information stored in the local cache. If the server receives a request to index an item, it can update its local cache and push the updated index information to the shared storage, where other search servers can obtain the updated index information and update their respective caches. If a new server is added, it can provision its local cache directly from the shared storage.

Storing index information in this manner can provide significant advantages. First, a server distributing an update of the index information can merely write the updated information to the shared storage rather than more tediously contacting each server to provide the updated information directly. Second, given that the index information is maintained in the shared storage, the loss of individual servers becomes negligible as any state maintained by those servers is already maintained in the shared storage. Still further, in some embodiments, additional reliability may be achieved as the shared storage may implement high availability and/or disaster recovery—techniques that may not be implemented by local storages. Third, scaling based on demand can occur more quickly and/or frequently as a new server provisions its local cache from the shared storage instead of bothering the other servers.

Turning now to FIG. 1, a block diagram of a search system 10 is depicted. In the illustrated embodiment, system 10 includes application servers 110, virtual machines 102 including search servers 120 and local caches 130, and shared storage 140 coupled together via interconnects 150. In some embodiments, search system 10 may be implemented differently than shown. For example, application servers 110 may not be part of system 10, multiple instances of shared storage 140 may be used, etc.

Application servers 110, in the illustrated embodiment, are operable to present an application that provides a user interface having search functionality. Accordingly, the application may present an input field that allows a user to enter one or more terms to be searched and present an interface displaying one or more results determined from the search. This application may correspond to any suitable application. For example, in some embodiments, the application facilitates customer relationship management (CRM) and may maintain various CRM data in a database system. Such an application may for example present a user interface allowing a user to search this CRM data such as searching various contact information, product information, etc. As another example, the application may present an interface for a database of documents accessible to the user and allow the user to search for particular ones of the documents. In various embodiments, servers 110 are web servers that present application content by serving web pages to client devices. Although described as servers 110, components 110 may also be client devices that execute the application locally and interface with a user directly. As shown in FIG. 1, applications servers 110 may send search requests 112 and index requests 114 to servers 120.

Search servers 120, in the illustrated embodiment, are executable to perform searches in response to receive search requests 112. As shown, each server 120 may be executed with a respective machine 102. In some embodiments, machines 102 are separate physical machines 102—thus, servers 120 execute on using different respective hardware. In other embodiments, machines 102 are virtual machines as shown in FIG. 1—or some other form of container such as Heroku® Dynos, Linux® containers (LXCs), Docker® containers, control groups (Cgroups), namespaces, etc. In such an embodiment, provisioning search servers 120 within containers may allow for greater utilization of underlying hardware as the same hardware can be shared by multiple containers. Servers 120 can also be more quickly deployed, in some instances, as additional servers 120 can be deployed onto existing underlying hardware rather than bring up new hardware. Still further, in some embodiments, machines 102 may be instantiated on a computer cluster implementing a cloud-based platform to execute containers.

As noted above, in various embodiments, search servers 120 service search requests based on index information 132 maintained in respective local caches 130 of machines 102. This index information 132 may define one or more index data structures used by servers 120 to determine search results based on terms specified in a given request 112. For example, if servers 120 support a document search, index information 132 may define an index data structure that maps author names to particular documents. Thus, if a received search request 112 specifies the name "Smith," a server 120 may reference the index data structure to determine the documents authored by "Smith." In various embodiments, a search server 120 may generate index information in response to receiving an index request 114 to index one or more items. For example, a server 120 may receive a request 114 to index a new document authored by "Smith," and may add index information 132 to the index data structure such that the new document is identified responsive to a search for "Smith." In various embodiments, search servers 120 synchronize index information 132 stored in their respective local caches 130 with index information 142 stored in shared storage 140 by performing pull operations 134 and/or push operations 136 as will be discussed in greater detail below with respect to FIGS. 3 and 4.

Shared storage 140, in the illustrated embodiment, is configured to serve as the primary storage maintaining index information for search servers 120. Storage 140 may correspond to any suitable form of network storage such as a network attached storage (NAS), storage area network (SAN), etc. In some embodiments, storage 140 is a service provided by a computer cluster implementing cloud storage (such as Amazon's Simple Storage Service™), which may be provided over a wide area network to servers 120. In some embodiments, storage 140 implements high availability (HA) and disaster recovery (DR) to further preserve index information 142. In various embodiments, storage 140 is shared such that it is accessible by multiple search servers 120 simultaneously in order to enable access to index information 142 in parallel. As will be described in greater detail below with respect to FIG. 2, index information 142 in storage 140 may also be organized into multiple segment files. Storage 140 may also maintain various metadata used to facilitate pulling index information 142 from storage 140 and pushing index information 132 to storage 140.

Figure 2:
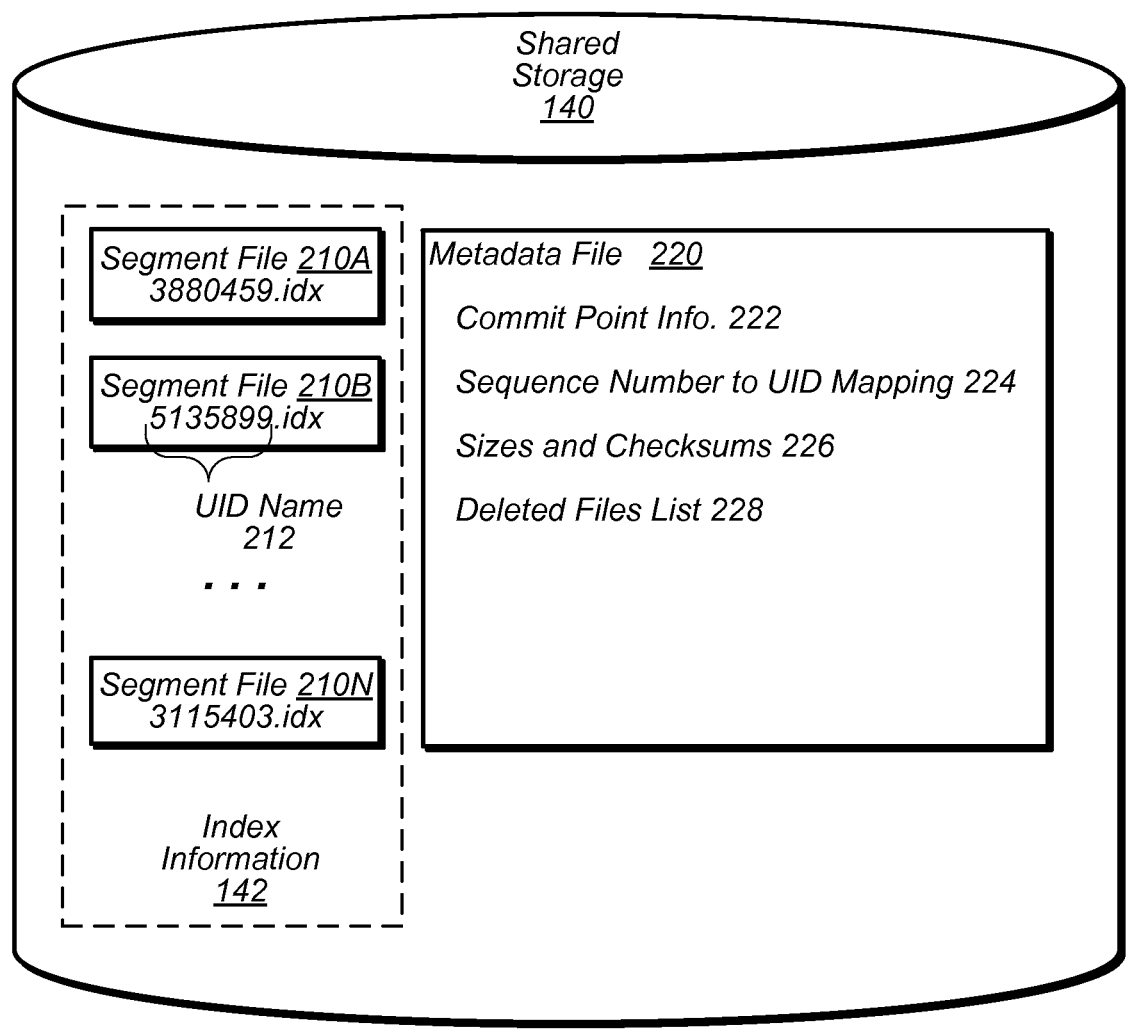
FIG. 2 is a block diagram illustrating one embodiment of the contents within the shared storage.

Turning now to FIG. 2, a block diagram of contents in shared storage 140 is depicted. In the illustrated embodiments, shared storage 140 includes multiple segment files 210A-N and a metadata file 220. Metadata file 220 further includes commit point information 222, mapping 224, sizes and checksums 226, and deleted files list 228. In some embodiments, storage 140 may be implemented different than shown—e.g., storage 140 may include multiple instances of index information 142 corresponding to different indexes, metadata file 220 may include more (or less) information than shown, etc.

Segment files 210, in the illustrated embodiment, contain portions of index information 142 that define the index data structures referenced by search servers 120 when performing searches. In some embodiments, files 210 are written using a copy-on-write storage scheme in which new files 210 are written each time new information 142 is added, updated, or deleted—as requested by an index request 114. For example, if a value in file 210B is to be updated, a new file 210 is written with the new value, but file 210B remains unaltered. Such a scheme may be performed to preserve data recorded in files 210 and stands in contrast to a write-in-place storage scheme in which data is updated or deleted within the file 210 where it resides. (In other embodiments, files 210 may be recorded using a write-in-place storage scheme.) To identify the ordering in which files are written (and thus determine what information 142 is currently pertinent), segment files 210 may be assigned a sequence number (e.g., an increasing counter value) indicative of the ordering in which files 210 are written to storage 140. (In some embodiments, this ordering may be reflective of the ordering in which files 210 were initially written to a local cache 130 as a file 210 may be written to the cache 130 before being pushed to storage 140.)

In one embodiment, files 210 may be named using the sequence numbers assigned to them. In some instances, however, using this naming scheme may potentially result in files 210 being overwritten. For example, if two servers 120 attempt to write files 210 using the same sequence number, the files will have the same name producing a conflict. A server 120 might also be mistaken as to the current sequence number and overwrite an existing file 210 having that sequence number. To account for this potential issue in some embodiments, files 210 may be assigned unique names, which may be independent of their sequence numbers. Accordingly, in the illustrated embodiment, files 210 are assigned a unique identifier (UID) name 212 in which at least a portion of each name includes a randomly generated number in order to reduce the possibility of potential file name conflicts.

Metadata file 220, in the illustrated embodiment, includes various metadata used by search servers 120 to facilitate synchronizing local caches 130 with shared storage 140. In various embodiments, file 220 is written to a consistent location in storage 140 (e.g., has a consistent file name and resides in a consistent directory path) that is known across search servers 120 in order to simplify reading by servers 120. In some embodiments, file 220 is one of multiple files 220, each associated with respective index data structure defined by index information 142. In other embodiments, however, metadata file 220 can include metadata for multiple index data structures defined by index information 142.

Commit point information 222, in the illustrated embodiment, identifies the files 210 composing the most recent version (i.e., the current version) of index information 142 defining the index data structures. In some embodiments, once a file 210 has stale/outdated index information 142, it may be removed from metadata 222. In other embodiments, files 210 with stale index information 142 may still be identified in information 222, but indicated as not composing the most recent version of index information 142. In some embodiments, information 222 identifies files 210 based on their respective sequence numbers. Information 222 may also include time stamp information identifying when storage 140 has been updated. As will be described with respect to FIG. 3, a search server 120 attempting to pull information 142 during a synchronization of its local cache 130 may read information 222 (along with mapping 224) to determine what segment files 210 are different (e.g., new from any previous synchronization) and should be retrieved from storage 140. As will be described with respect to FIG. 4, a search server 120 attempting to push information 132 during a synchronization may similarly read information 222 to determine what segment files 210 should be written from its cache 130 to storage 140.

Sequence number to UID mapping 224, in the illustrated embodiment, is a mapping of sequence numbers to files names of files 210. Accordingly, a search server 120 attempting to pull the latest files 220 may initially read information 222 to determine their sequence numbers and then reference mapping 224 to determine the specific file names of the files 220 to pull. In embodiments in which UID names 212 are not used, mapping 224 may be implemented differently to reflect the different naming scheme (or not implemented depending on naming scheme).

Sizes and checksums 226, in the illustrated embodiment, is a list of file sizes and checksums generated for segment files 210. This metadata 226 may be recorded in storage 140 when a search server 120 writes a segment file 210 to storage 140 and may be used to determine if that file 210 (and more general information 142) has later become corrupted. As will be described below with respect to FIG. 5A, a search server 120 may determine that index information 132 in its cache 130 has become corrupt and attempt to replace it with information 142 from storage 140. If information 142 is determined to be corrupted (e.g., as determined based on metadata 226), the search server 120 may request that another server 120 replace index information 142 with the index information 132 from its cache 130 as will be described below with respect to FIG. 5B.

Deleted files list 228, in the illustrated embodiment, is a list of files 210 scheduled for deletion—but may not yet be deleted. In some embodiments, a server 120 may determine that a particular file 210 should be deleted (e.g., because it no longer includes current information) and store an indication of that file 210 and a time stamp in list 228 without deleting the file 210 at that time. At a later point, a server 120 (which may be the same server 120 or a different server 120) attempting to synchronize its local cache 130 with shared storage 140 may read list 228 along with the timestamps stored in the list 228. If any of the timestamps satisfies a time threshold, the server 120 may then delete the files 210 corresponding those older time stamps. Such a deletion scheme may allow index information to be temporarily preserved (e.g., for recovery purposes) after a determination has been made to the delete information.

Figure 3:
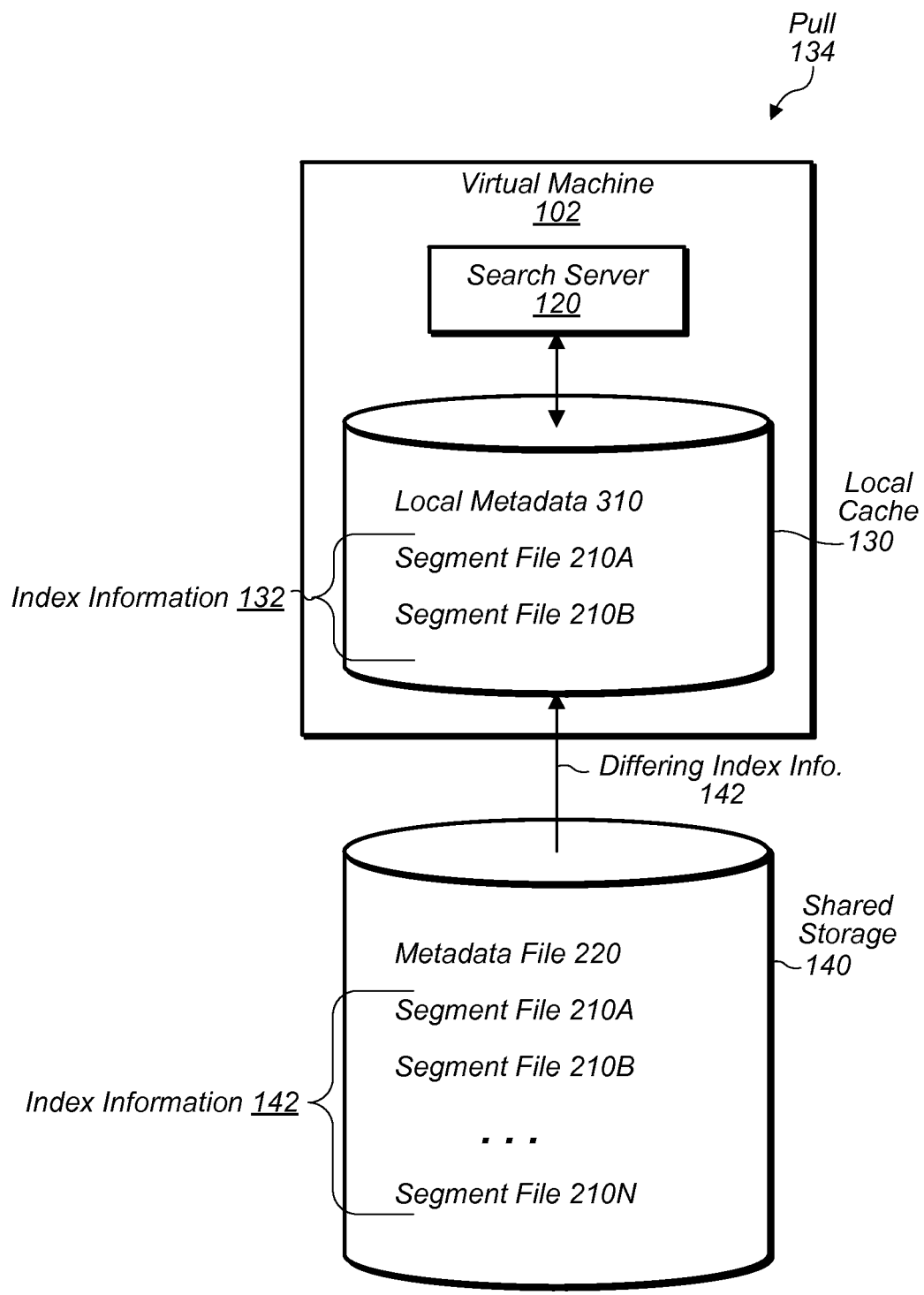
FIG. 3 is a block diagram illustrating one embodiment of a search server pulling index information from the shared storage.

Turning now to FIG. 3, a block diagram of a pull operation 134 to synchronize a local cache 130 with shared storage 140 is depicted. As noted above, this operation 134 may be performed after a search server 120 is added to the cluster of servers 120—e.g., in response to a virtual machine 102 being instantiated with the added server 120. In various embodiments, search servers 120 may also perform pull operations 134 at regular intervals in order to ensure that their caches 130 are synchronized with storage 140. In some embodiments, a search server 120 updating storage 140 may use a distributed coordination application, such as Apache ZooKeeper™, to notify other servers 120 when an update has occurred in order to cause them to perform a pull operation 134. In some embodiments, a pull operation 134 may also be initiated if a server 120 receives a search request 112 to perform a search using an index data structure that is not already defined by segment files 210 stored in its local cache 130.

As shown, a search server 120 may already include local metadata 310 and some index information 132, which may include one or more segment files 210—assuming a synchronization has already been performed. In the illustrated embodiment, local metadata 310 identifies the segment files 210 that are stored in local cache 130 and may include any of the metadata 222-228 discussed above with respect to metadata file 220.

For example, in some embodiments, local metadata 310 may include a set of sequence numbers identifying which files 210 are stored in cache 130.

In various embodiments, pull operation 134 may be begin with search server 120 reading metadata file 220 to determine whether index information 132 in cache 130 differs from index information 142 in shared storage 140. In some embodiments, this determination may include comparing the sequence numbers in local metadata 310 with sequence numbers in metadata file 220 (specifically in commit point information 222 discussed above) to determine what segment files 210 in storage 140 are not present in cache 130. In one embodiment, this comparison may initially include comparing the sequence number of the most recently stored segment file 210 as indicated in metadata 310 with the sequence number of the most recently stored segment file 210 as indicated in metadata file 220. If these numbers are the same, search server 120 may determine that cache 130 is synchronized with storage 140 and take no further action. If they differ—meaning that cache 130 and storage 140 are not synchronized, search server 120 may compare each of the sequences numbers in metadata 310 and metadata file 220 to identify differing segment files 210.

Once a search server 120 has identified index information 142 that differs from its index information 132, the search server 120 may pull this differing index information 142 into its local cache 130. In some embodiments, this may including pulling any information 142 determined to differ form information 132. In other embodiments, however, this may include pulling only the segment files 210 for the index data structures being used by the search server 120. For example, if search server 120 stores segments files 210 defining an index XYZ and has received a search request 112 to perform a search using index ABC, search server 120 may pull segment files 210 for index data structures XYZ and ABC, but not segment files 210 for index DEF not being used by that server 120.

Figure 4:
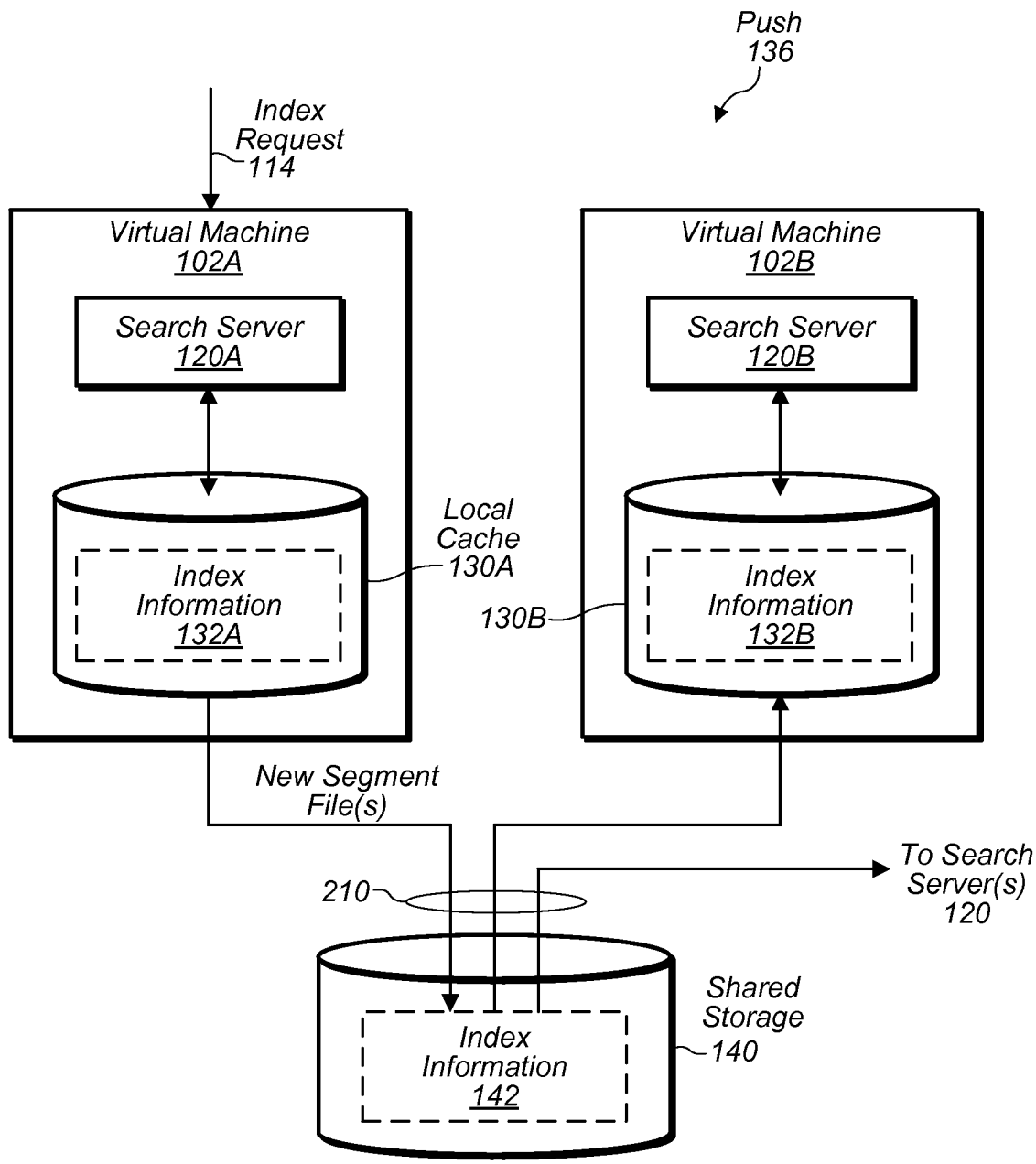
FIG. 4 is a block diagram illustrating one embodiment of a search server pushing index information to the shared storage.

Turning now to FIG. 4, a block diagram of a push operation 136 to synchronize shared storage 140 with a local cache 130 is depicted. As noted above, a search server 120 may receive an index request 114 to add, modify, or delete items referenced in an index data structure defined by index information 132 and 142. In response to receive an index request 114, a search server 120 may generate a new segment file 210 and store a first instance of the file 210 in its local cache 130. In some embodiments, new segment files 210 may also be created by merging the index information from multiple files 210 to a single file 210. Once a new segment file 210 has been stored in local cache 130, a search server 120 may perform a push 136 to store a second instance of the new segment file 210 in storage 140 in order to facilitate its distribution to other servers 120.

As with pull operation 134, a push operation 136 may begin with the search server 120 reading metadata file 220 to determine what segment files 210 in cache 130 are new relative segment files 210 in shared storage 140. If any of the files 210 differ, the search server 120 may build a list of the differing files 210 and push those differing files 210 from its local cache 130 to shared storage 140. (In some embodiments, search server 120 may also pull files 210 from shared storage 140 determined to be missing from local cache 130.) Once the new segment files 210 have been successfully pushed to storage 140, the search server 120 may update metadata file 220 to reflect that the new files 210 have been committed to shared storage 140. In some embodiments, the search server 120 may also notify other servers 120 of the updated index information 142; however, in other embodiments, the other servers 120 may learn of the updated index information 142 when they eventually perform a pull 134.

In some embodiments, push operations 136 are performed synchronously. That is, upon storing a first instance of a segment file 210 in local cache 130, a push operation 136 is performed to store a second instance of the segment file 210 in shared storage 140. In other embodiments, push operations 136 are performed asynchronously. For example, a search server 120 performing indexing may initiate a push operation 136 at regular intervals to push any newly created segment files 210 in cache 130 to storage 410. Alternatively, search server 120 may wait until it has generated a threshold number of new segment files 210 in cache 130 and then perform a batch synchronization in which it pushes a set of new files 210 to storage 140.

Figure 5A:
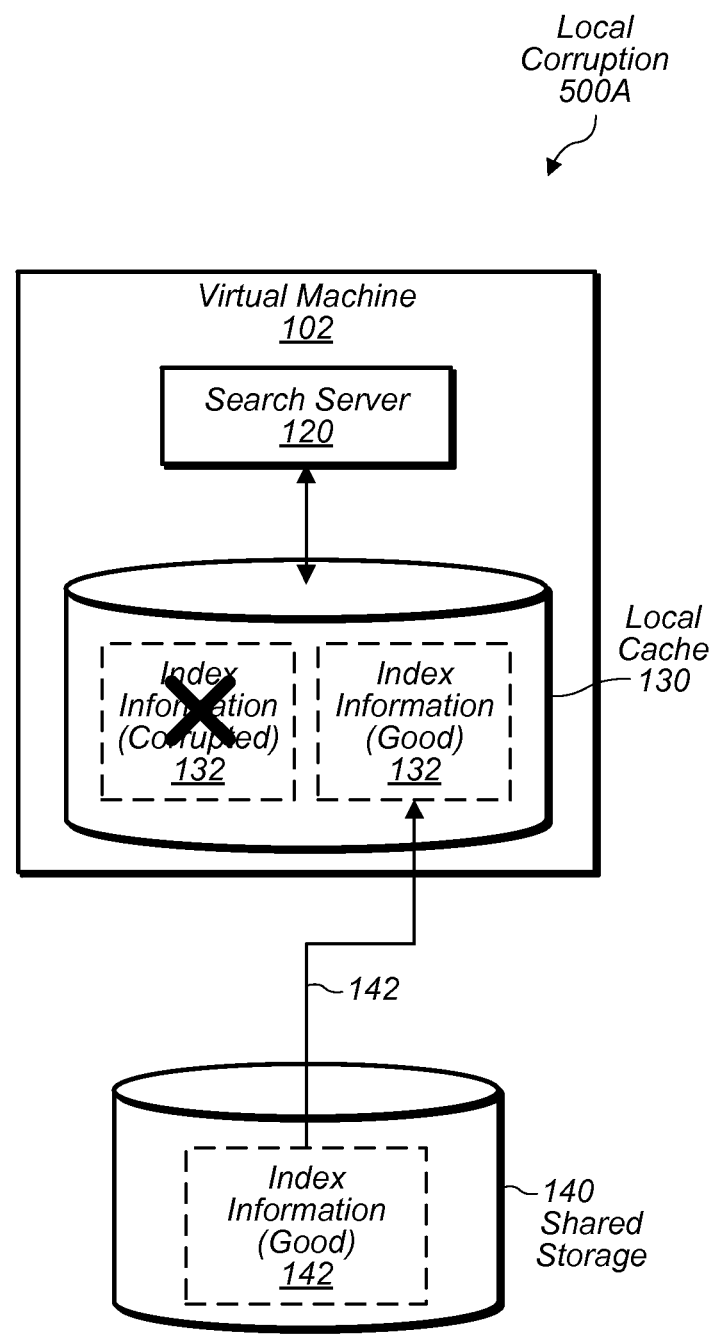
FIGS. 5A and 5B are block diagrams illustrating embodiments of the search system handling local and storage corruptions.

Turning now to FIG. 5A, a block diagram of fixing a local corruption 500A is depicted. As noted above, a search server 120 may determine that the index information 132 in its local cache 130 has become corrupted. In response to determining that the index information 132 is corrupt, search server 120 may perform a pull 134 to replace the index information 132 with uncorrupted index information 142 from shared storage 140. If, however, index information 142 in shared storage 140 is determined to be corrupted, search server 120 may proceed as discussed next with FIG. 5B.

Figure 5B:
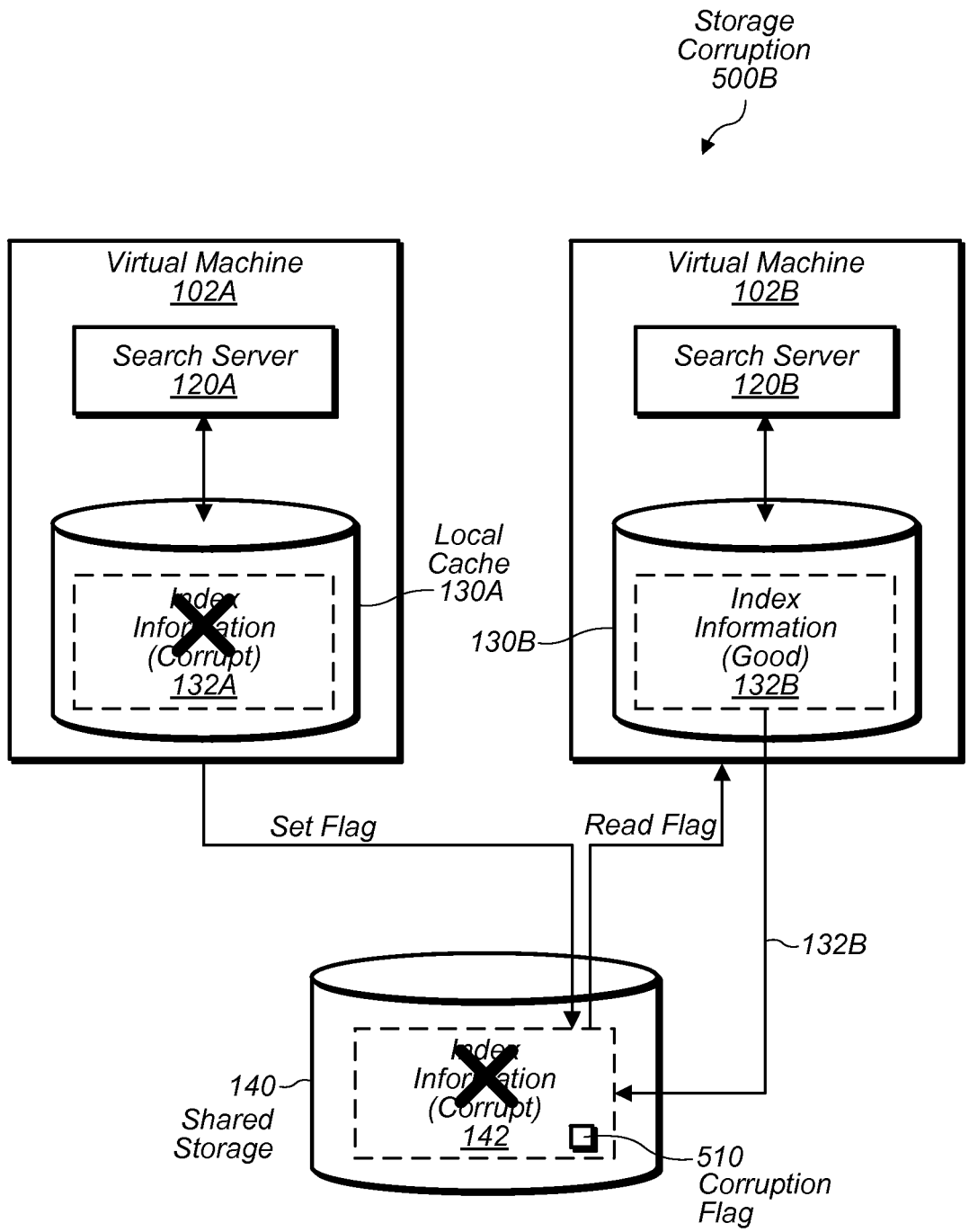

Turning now to FIG. 5B, a block diagram of fixing a storage corruption 500B is depicted. As noted above, in some instances, a search server 120 may determine that the information 142 in shared storage 140 has become corrupted. If the search server 120's index information 132 in its cache 130 is uncorrupted, it may perform a push 136 of its information 132 to replace index information 142. If, however, its index information 132 is corrupted (as is the case in FIG. 5B), the search server 120 may send a notification about the corruption to the other servers 120 via shared storage 140. Accordingly, in the illustrated embodiment, search server 120A sets corruption flag 510 to notify another server 120B about the determined corruption. In response to reading the flag 510, search server 120B may then replace index information 142 in shared storage 140 by pushing its local index information 132 from its cache 130—assuming this information is uncorrupted. In other embodiments, however, search servers 120 may notify one another of corruptions using other techniques such as contacting one another directly.

Turning now to FIG. 6A, a flowchart of a method 600 for servicing search requests based on index information stored in a storage shared between multiple search servers is depicted. Method 600 is one embodiment of a method performed by one or more search servers such search servers 120. In some instances, performance of method 600 may provide greater reliability and/or scalability.

In step 605, a first search server maintains a local cache (e.g., local cache 130) including index information (e.g., index information 132) usable to service received search requests (e.g., search requests 112). In various embodiments, method 600 includes instantiating a container (e.g. virtual machine 102A) including the first search server and executing the first search server within the container. In some embodiments, method 600 includes determining a load being experienced by the plurality of search servers and instantiating another container (e.g. virtual machine 102N) including another search server executable to retrieve index information from the shared storage and service search requests.

In step 610, the first search server synchronizes the local cache with the shared storage (e.g., shared storage 140). In various embodiments, the synchronizing includes retrieving, from the shared storage, metadata (e.g., metadata file 220) indicative of the index information in the shared storage, determining, based on the metadata, whether the index information in the local cache differs from the shared storage, and in response to determining that the index information in the local cache differs from the index information in the shared storage, updating the index information in the local cache with the index information in shared storage. In some embodiments, the index information in the local cache is distributed among a first set of segment files (e.g., segment files 210). In such an embodiment, the retrieved metadata identifies a second set of segment files (e.g., in commit point information 222) in the shared storage, and the determining includes comparing the first set of segment files with the second set of segment files to identify segment files in the shared storage that are not included in the local cache.

In step 615, the first search server receives a search request to conduct a search.

In step 620, the first search server provides, in response to the search request, one or more results determined using the updated index information. In some embodiments, method 600 further includes the first search server generating index information in response to a request to index one or more items, storing a first instance of the generated index information in the local cache (the first instance of the generated index information being usable by the first search server to service search requests for the one or more items), and storing a second instance of the generated index information in the shared storage (the second instance of the generated index information being usable by a second of the plurality of search servers to service search requests for the one or more items). In some embodiments, method 600 further includes the first search server determining that the index information in the local cache has become corrupted and, in response determining that the index information in the local cache has become corrupted, attempting to replace the index information in the local cache with the index information in the shared storage. In some embodiments, method 600 further includes the first search server determining that the index information in the shared storage has become corrupted and storing, in the shared storage, a notification (e.g., corruption flag 510) indicating that the index information in the shared storage has become corrupted. In such an embodiment, the notification causes a second of the plurality of search servers to replace the index information in the shared storage with index information from a local cache maintained by the second search server. In some embodiments, method 600 further includes the first search server determining to delete one or more segment files storing index information in the shared storage and storing, in the shared storage, an indication (e.g., deleted files list 228) that the one or more segment files are to be deleted. In such an embodiment, a second search server deletes the one or more segment files in response to determining that a threshold amount of time has passed since the storing of the indication.

Turning now to FIG. 6B, a flow chart of a method 630 for distributing index information to a storage shared between multiple search servers is depicted. Method 630 is another embodiment of a method performed by a search server such as search server 120. In some instances, performance of method 630 may provide greater reliability and/or scalability.

In step 635, a search server receives a request (e.g., index request 114) to index one or more items such that the one or more items are identifiable as search results in response to a performed search.

In step 640, the search server generates, in response to the request, index information based on the one or more items.

In step 645, the search server adds a first instance of the generated index information to index information (e.g., index information 132) stored in a local cache (e.g., local cache 130) accessible to the first search server.

In step 650, the search server adds a second instance of the generated index information to index information (e.g., index information 142) stored in the shared storage (e.g., shared storage 140) such that the generated index information is accessible to the plurality of search servers. In some embodiments, adding the second instance includes storing, in the shared storage, sequence metadata (e.g., commit point information 222) identifying an ordering in which the second instance of generated index information is stored relative to other index information stored in the shared storage, the identified ordering being usable by ones of the plurality of search servers to determine whether to retrieve the second instance of generated index information. In some embodiments, adding the second instance of generated index information includes storing, in the shared storage, a segment file (e.g., segment file 210) including the second instance of generated index information and assigning, to the segment file, a file name (e.g., a UID name 212) that includes a randomly generated value. In some embodiments, adding the second instance of generated index information includes storing, in the shared storage, a segment file including the second instance of generated index information and storing, in the shared storage, a checksum (e.g., sizes and checksums 226) usable to verify the segment file. In some embodiments, adding the second instance of generated index information includes asynchronous pushing the second instance of the generated index information to the shared storage.

In step 655, the search server performs a search that includes identifying one of the one or more items as a search result determined based on the first instance of generated index information stored in the local cache. In some embodiments, method 630 further includes the search server synchronizing the local cache with the shared storage, the synchronizing including retrieving, from the shared storage, sequence information (e.g., commit point information 222) identifying an ordering in which index information is stored to the shared storage, determining, based on the ordering, whether the index information in the local cache differs from the shared storage, and in response to the determining, updating the index information in the local cache with the index information in shared storage. In some embodiments, method 630 further includes the search server determining that the shared storage includes a notification (e.g., corruption flag 510) from another one of the plurality of search servers indicating that index information in the shared storage has become corrupted, and in response to the notification, storing index information from the local cache in the shared storage. In some embodiments, method 630 further includes the search server determining that the shared storage includes a notification (e.g., in deleted files list 228) from another one of the plurality of search servers indicating that a segment file in the shared storage is to be deleted, determining, in response to the notification, an amount of time since the notification was stored in the share storage, and deleting the segment file in response to the amount of time satisfying a threshold.

Figure 6C:
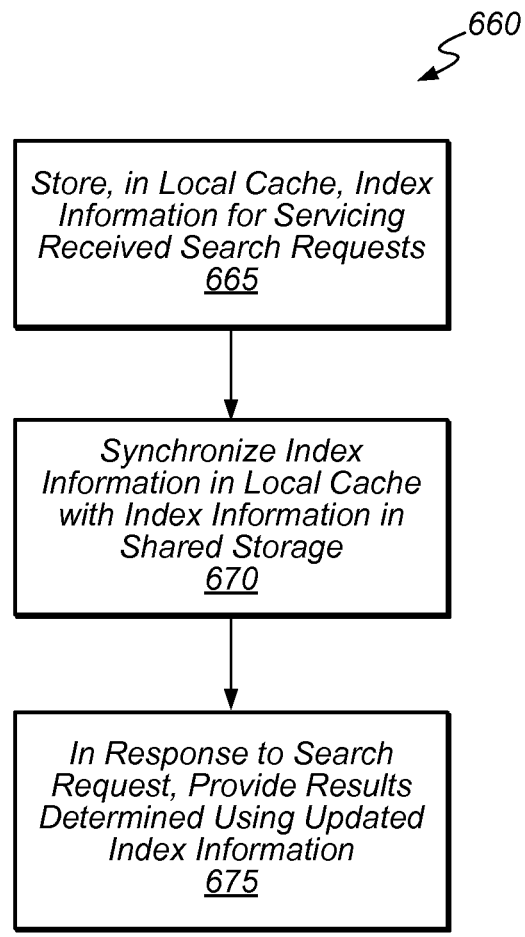

Turning now to FIG. 6C, a flow chart of a method 660 for servicing search requests is depicted. Method 660 is another embodiment of a method performed by a search server such as search server 120. In some instances, performance of method 660 may provide greater reliability and/or scalability.

In step 665, the search server stores, in a local cache (e.g., local cache 130), index information (e.g., index information 132) for servicing received search requests (e.g., requests 112).

In step 670, the search server synchronizes index information in the local cache with the index information (e.g., index information 142) in the shared storage (e.g., shared storage 140). In various embodiments, the synchronizing includes retrieving, from the shared storage, metadata (e.g., metadata file 220) indicative of the index information in the shared storage, identifying, based on the metadata, index information in the shared storage that differs from the index information in the local cache, and updating the index information in the local cache with the identified index information in shared storage. In various embodiments, the identifying includes comparing, based on the metadata, a first set of segment files stored in the local cache with a second set of files stored in shared storage. In some embodiments, the metadata specifies a sequence number (e.g., commit point information 222) of a most recently stored segment file in the shared storage, and the identifying includes comparing the sequence number with a sequence number of a most recently stored segment file in the local cache.

In step 675, in response to a search request, the search server provides one or more results determined using the updated index information (e.g., differing index information 142). In some embodiments, method 660 further includes indexing one or more items to produce index information usable to identify the one or more items in a search, storing the produced index information in the local cache to facilitate subsequent searches by the search server, and storing the produced index information (e.g., as a new segment file 210) in the shared storage to facilitate subsequent searches by others of the plurality of search servers. In some embodiments, method 660 further includes determining that index information in the shared storage is become corrupted and, in response to the determining, setting a corruption flag (e.g., corruption flag 510) that causes another of the plurality of search servers to replace index information in the shared storage with index information from a local cache (e.g., local cache 130B) of the other search server.

Exemplary Computer System

Figure 7:
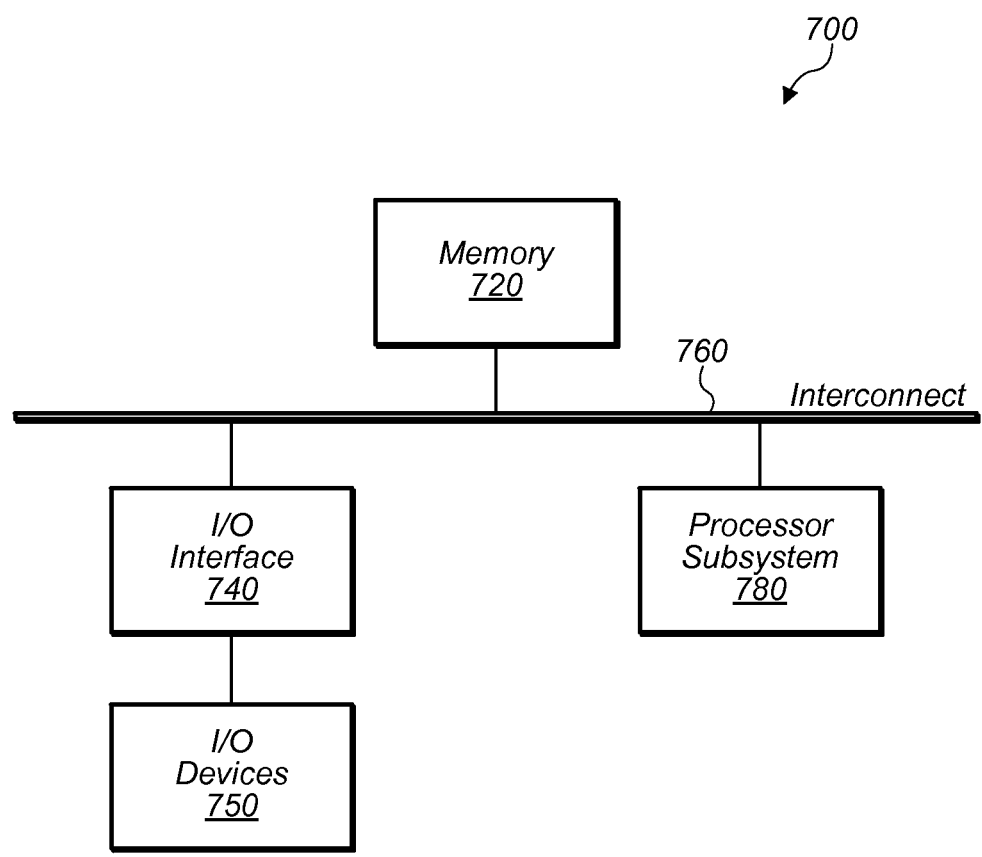
FIG. 7 is a block diagram illustrating one embodiment of an exemplary computer system.

Turning now to FIG. 7, a block diagram of an exemplary computer system 700, which may implement functionality of one or more of elements 102-104, is depicted. Computer system 700 includes a processor subsystem 780 that is coupled to a system memory 720 and I/O interfaces(s) 740 via an interconnect 760 (e.g., a system bus). I/O interface(s) 740 is coupled to one or more I/O devices 750. Computer system 700 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 700 is shown in FIG. 7 for convenience, system 700 may also be implemented as two or more computer systems operating together.

Processor subsystem 780 may include one or more processors or processing units. In various embodiments of computer system 700, multiple instances of processor subsystem 780 may be coupled to interconnect 760. In various embodiments, processor subsystem 780 (or each processor unit within 780) may contain a cache or other form of on-board memory.

System memory 720 is usable store program instructions executable by processor subsystem 780 to cause system 700 perform various operations described herein. System memory 720 may be implemented using different physical memory media, such as hard disk storage, floppy disk storage, removable disk storage, flash memory, random access memory (RAM—SRAM, EDO RAM, SDRAM, DDR SDRAM, RAMBUS RAM, etc.), read only memory (PROM, EEPROM, etc.), and so on. Memory in computer system 700 is not limited to primary storage such as memory 720. Rather, computer system 700 may also include other forms of storage such as cache memory in processor subsystem 780 and secondary storage on I/O Devices 750 (e.g., a hard drive, storage array, etc.). In some embodiments, these other forms of storage may also store program instructions executable by processor subsystem 780. In some embodiments, memory 720 may include program instruction for one or more of elements 102-140.

I/O interfaces 740 may be any of various types of interfaces configured to couple to and communicate with other devices, according to various embodiments. In one embodiment, I/O interface 740 is a bridge chip (e.g., Southbridge) from a front-side to one or more back-side buses. I/O interfaces 740 may be coupled to one or more I/O devices 750 via one or more corresponding buses or other interfaces. Examples of I/O devices 750 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 700 is coupled to a network via a network interface device 750 (e.g., configured to communicate over WiFi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method of servicing search requests based on index information stored in a storage shared between a plurality of search servers, comprising:
    maintaining, by a first of the plurality of search servers, a local cache including index information usable to service received search requests;
    synchronizing, by the first search server, the local cache with the shared storage, wherein the synchronizing includes:
        retrieving, from the shared storage, metadata indicative of the index information in the shared storage;
        determining, based on the metadata, whether the index information in the local cache differs from the shared storage;
        in response to determining that the index information in the local cache differs from the index information in the shared storage, updating the index information in the local cache with the index information in the shared storage; and
        updating the index information in the shared storage with at least a portion of the index information in the local cache that is not stored at the shared storage;
    receiving, by the first search server, a search request to conduct a search; and
    in response to the search request, providing, by the first search server, one or more results determined using the updated index information.

2. The method of claim 1, wherein the index information in the local cache is distributed among a first set of segment files;
    wherein the retrieved metadata identifies a second set of segment files in the shared storage; and
    wherein the determining includes comparing the first set of segment files with the second set of segment files to identify segment files in the shared storage that are not included in the local cache.

3. The method of claim 1, further comprising:
    generating, by the first search server, index information in response to a request to index one or more items;
    storing, by the first search server, a first instance of the generated index information in the local cache, wherein the first instance of the generated index information is usable by the first search server to service search requests for the one or more items; and
    storing, by the first search server, a second instance of the generated index information in the shared storage, wherein the second instance of the generated index information corresponds to the portion and is usable by a second of the plurality of search servers to service search requests for the one or more items.

4. The method of claim 1, further comprising:
    determining, by the first search server, that the index information in the local cache has become corrupted; and
    in response to determining that the index information in the local cache has become corrupted, the first search server attempting to replace the index information in the local cache with the index information in the shared storage.

5. The method of claim 4, further comprising:
    determining, by the first search server, that the index information in the shared storage has become corrupted; and
    storing, by the first search server and in the shared storage, a notification indicating that the index information in the shared storage has become corrupted, wherein the notification causes a second of the plurality of search servers to replace the index information in the shared storage with index information from a local cache maintained by the second search server.

6. The method of claim 1, further comprising:
    determining, by the first search server, to delete one or more segment files storing index information in the shared storage;
    storing, by the first search server and in the shared storage, an indication that the one or more segment files are to be deleted; and
    deleting, by a second of the plurality of search servers, the one or more segment files in response to determining that a threshold amount of time has passed since the storing of the indication.

7. The method of claim 1, further comprising:
    instantiating a container including the first search server; and
    executing the first search server within the container.

8. The method of claim 7, further comprising:
    determining a load being experienced by the plurality of search servers; and
    instantiating another container including another search server executable to retrieve index information from the shared storage and service search requests.

9. A non-transitory computer readable medium having program instructions stored thereon that are capable of causing a first of a plurality of search servers to implement operations for distributing index information to a storage shared between the plurality of search servers, the operations comprising:
    receiving a request to index one or more items such that the one or more items are identifiable as search results in response to a performed search;
    in response to the request, generating index information based on the one or more items;
    adding a first instance of the generated index information to index information stored in a local cache accessible to the first search server;
    synchronizing the local cache with the shared storage, wherein the synchronizing includes:
        adding a second instance of the generated index information to index information stored in the shared storage such that the generated index information is accessible to the plurality of search servers; and
        updating the index information in the local cache with at least a portion of the index information in the shared storage that is not stored at the local cache; and
    performing a search that includes identifying one of the one or more items as a search result determined based on the first instance of generated index information stored in the local cache.

10. The computer readable medium of claim 9, wherein adding the second instance includes:
    storing, in the shared storage, sequence metadata identifying an ordering in which the second instance of generated index information is stored relative to other index information stored in the shared storage, wherein the identified ordering is usable by ones of the plurality of search servers to determine whether to retrieve the second instance of generated index information.

11. The computer readable medium of claim 9, wherein adding the second instance of generated index information includes:
storing, in the shared storage, a segment file including the second instance of generated index information, wherein the storing includes assigning, to the segment file, a file name that includes a randomly generated value.

12. The computer readable medium of claim 9, wherein adding the second instance of generated index information includes:
storing, in the shared storage, a segment file including the second instance of generated index information; and
storing, in the shared storage, a checksum usable to verify the segment file.

13. The computer readable medium of claim 9, wherein the synchronizing of the local cache with the shared storage includes:
retrieving, from the shared storage, sequence information identifying an ordering in which index information is stored to the shared storage;
determining, based on the ordering, whether the index information in the local cache differs from the shared storage; and
in response to the determining, updating the index information in the local cache with the portion of the index information in the shared storage.

14. The computer readable medium of claim 9, wherein the operations further comprise:
determining that the shared storage includes a notification from another one of the plurality of search servers indicating that index information in the shared storage has become corrupted; and
in response to the notification, storing index information from the local cache in the shared storage.

15. The computer readable medium of claim 9, wherein the operations further comprise:
determining that the shared storage includes a notification from another one of the plurality of search servers indicating that a segment file in the shared storage is to be deleted;
in response to the notification, determining an amount of time since the notification was stored in the shared storage; and
deleting the segment file in response to the amount of time satisfying a threshold.

16. A non-transitory computer readable medium having program instructions stored thereon that are capable of causing a search server to implement operations for servicing search requests based on index information stored in a storage shared between a plurality of search servers, the operations comprising:
storing, in a local cache, index information for servicing received search requests;
synchronizing index information in the local cache with the index information in the shared storage, wherein the synchronizing includes:
retrieving, from the shared storage, metadata indicative of the index information in the shared storage;
identifying, based on the metadata, index information in the shared storage that differs from the index information in the local cache; and
updating the index information in the local cache with the identified index information in the shared storage; and
updating the index information in the shared storage with at least a portion of the index information in the local cache that is not stored at the shared storage; and
in response to a search request, providing one or more results determined using the updated index information.

17. The computer readable medium of claim 16, wherein the metadata specifies a sequence number of a most recently stored segment file in the shared storage, wherein the segment file includes index information; and
wherein the identifying includes comparing the sequence number with a sequence number of a most recently stored segment file in the local cache.

18. The computer readable medium of claim 16, wherein the operations further comprise:
indexing one or more items to produce index information usable to identify the one or more items in a search;
storing the produced index information in the local cache to facilitate subsequent searches by the search server; and
storing the produced index information in the shared storage to facilitate subsequent searches by others of the plurality of search servers.

19. The computer readable medium of claim 16, wherein the operations further comprise:
determining that index information in the shared storage is become corrupted; and
in response to the determining, setting a corruption flag that causes another of the plurality of search servers to replace index information in the shared storage with index information from a local cache of the other search server.

* * * * *